SELECTING MEANS IN CROSS BAR SWITCHES

Filed April 23, 1957 4 Sheets-Sheet 1

INVENTORS
K. A. LUNDQUIST
E. A. ERICSSON
K. G. JOHNSON
H. V. ALEXANDERSSON
BY Fredrick E. Kane
ATTORNEY

SELECTING MEANS IN CROSS BAR SWITCHES

Filed April 23, 1957

4 Sheets-Sheet 2

INVENTORS
K. A. LUNDQVIST
E. A. ERICSSON
K. G. JOHNSON
H. V. ALEXANDERSSON

BY [signature]
ATTORNEY

INVENTORS
K. A. LUNDQVIST
E. A. ERICSSON
K. G. JOHNSON
H. V. ALEXANDERSSON
BY [signature]
ATTORNEY INVENTORS
K. A. LUNDQVIST
E. A. ERICSSON
K. G. JOHNSON
H. V. ALEXANDERSSON
BY [signature]
ATTORNEY 3,001,023

SELECTING MEANS IN CROSS BAR SWITCHES

Karl Axel Lundkvist, Eric Arvid Ericsson, and Karl Georg Johnson, Stockholm, and Harald Valdemar Alexandersson, Lidingo, Sweden, assignors to Telefonaktiebolaget L. M. Ericsson, Stockholm, Sweden, a corporation of Sweden Filed Apr. 23, 1957, Ser. No. 654,477
4 Claims. (Cl. 179—27.54)

This invention relates to a cross bar switch of the kind containing a plurality of selecting bars with selecting magnets and selecting members and a plurality of operating bars with operating magnets, a number of contact bands for each operating bar, which bands are located in one plane and divided into at least two groups or storeys located above each other and for each selecting bar a number of contact spring sets corresponding to the number of operating bars, the contact springs of said contact spring sets being located in a plane running perpendicularly to the plane of said contact bands, each contact spring set containing at least two groups of contact springs located above each other and corresponding to the above mentioned groups or storeys of contact bands, and a driver, which is common to these groups of contact springs. In said cross bar switches there have hitherto been used either particular switching means, e.g. relays for each operating bar or at least two separate rows of contact spring sets located along at least one additional selecting bar in order to determine which of the groups of contact bands is to be used for an operating bar. Such a cross bar switch is described in U.S. Patent No. 1,484,771. Each operating bar has two groups of contact sets, one for groups of subscribers' lines, where each contact set contains contact springs for three subscribers' lines, and one for a trunk line where said subscribers' lines are separated. Three groups of contact bands or conductors join the contact spring sets for subscribers' lines with the contact spring sets for the trunk line and three separate selecting bars are used for the selection between said groups of contact bands.

According to the invention selection between at least two groups occurs by means of only one row of contact spring sets and, one selecting bar, space and costs thus being saved. This is achieved by means of a separate selecting bar and a separate row of contact spring sets, a separate driver for each of the groups of contact springs in the contact spring sets corresponding to the separate selecting bar, and a change over mechanism for each of the contact spring sets corresponding to the separate selecting bar, said change over mechanism being operated by the selecting bar and thus deflecting one of said drivers out of engagement with corresponding operating bar and bringing a second one to be engaged by the same.

The invention will now be described more closely by means of the annexed drawings.

Figures 1, 2:
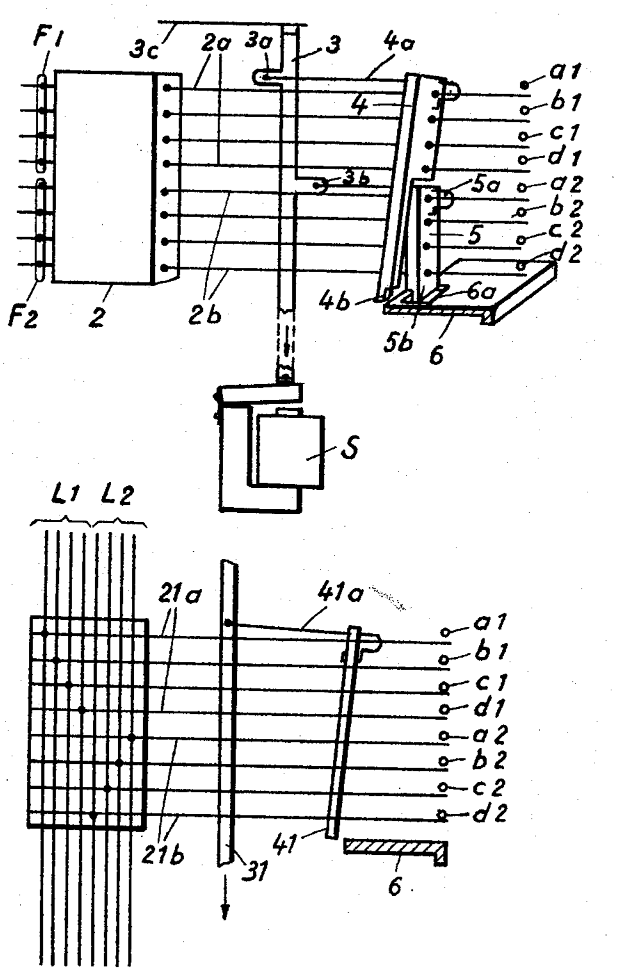
Figure 3:
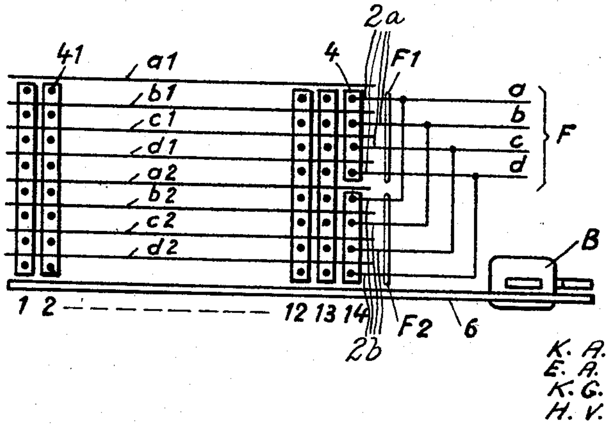
Figure 4:
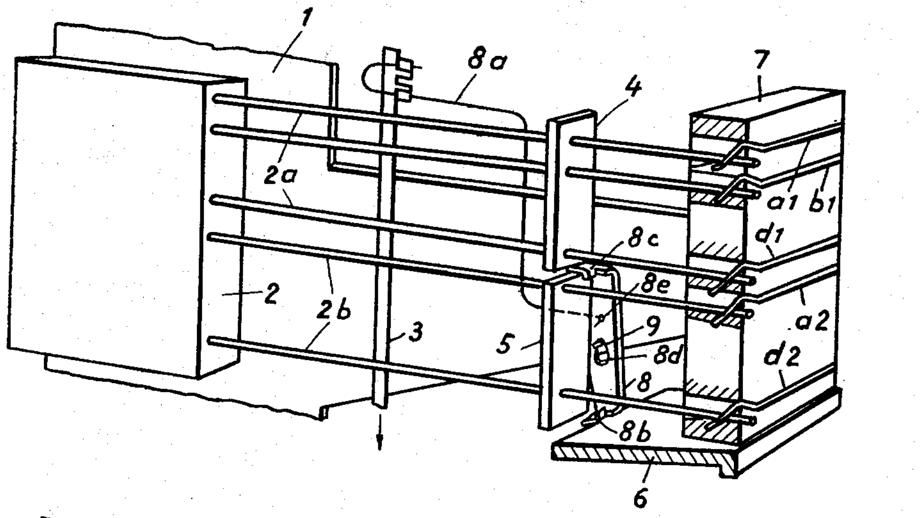
Figure 5:
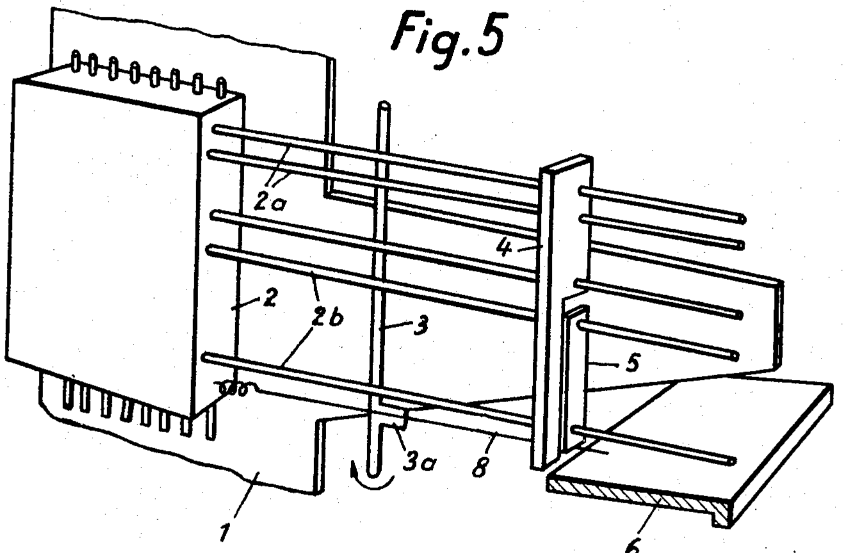
Figure 6:
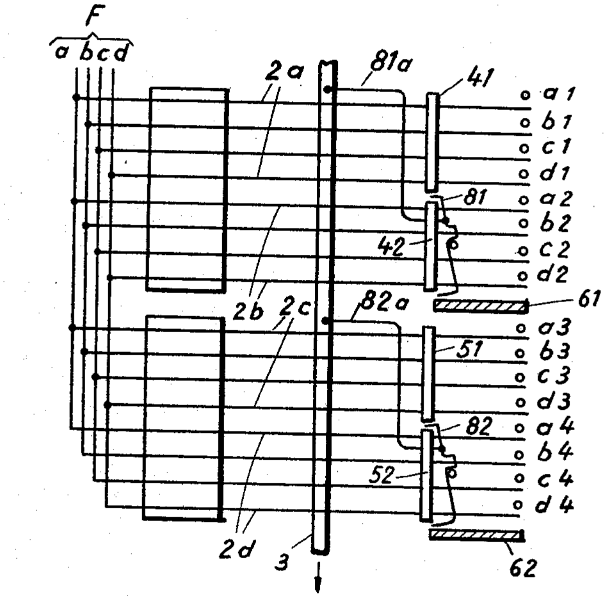
Figure 7:
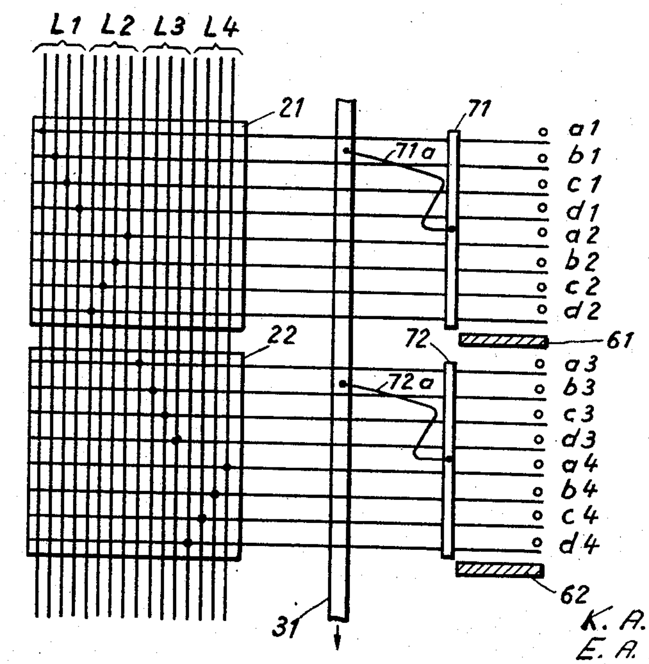
Figure 8:
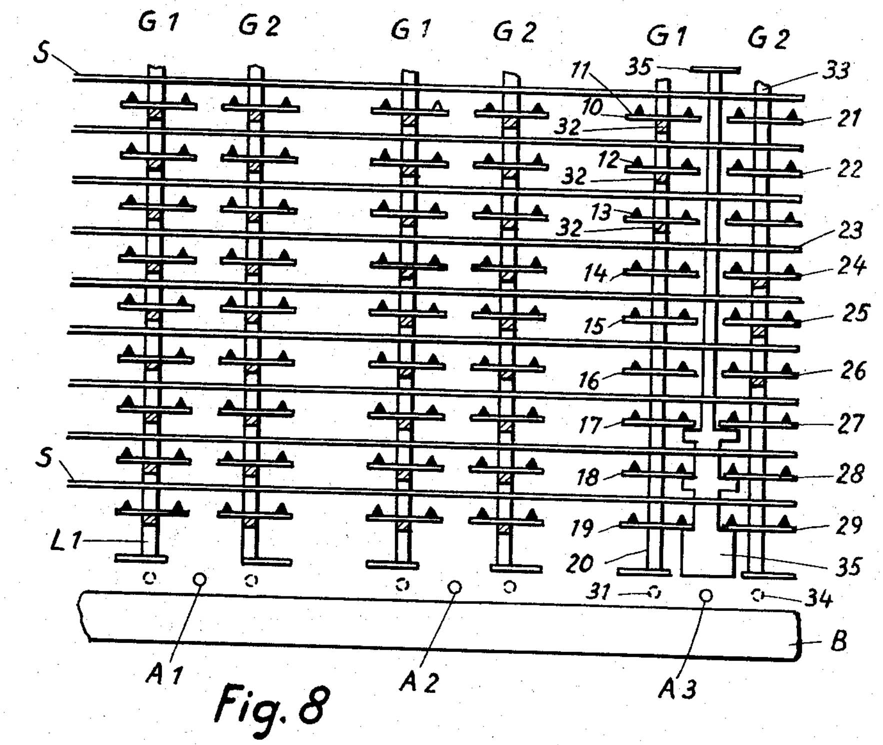
Figure 9:
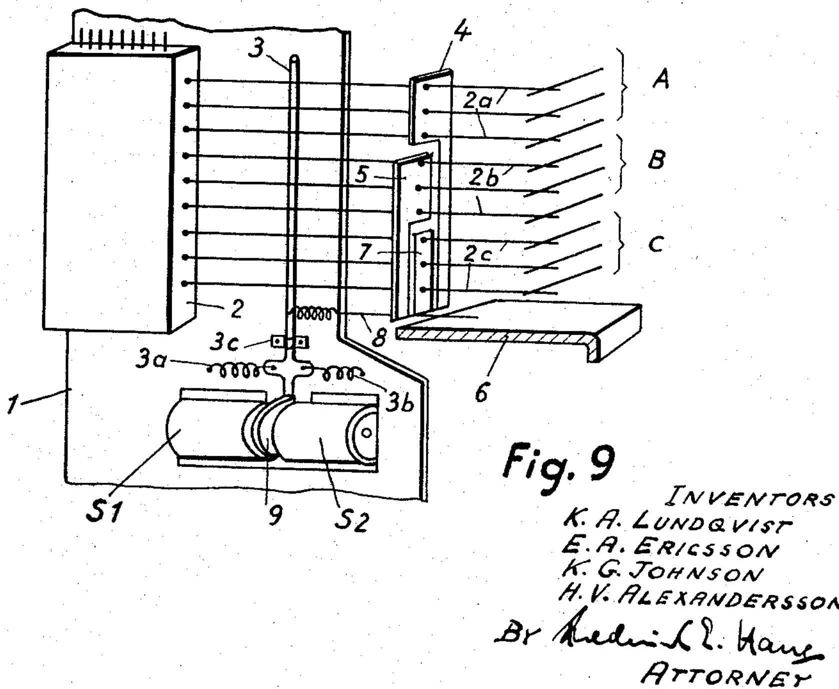

FIG. 1 shows an embodiment of the contact spring sets pertaining to the separate selecting bar, FIG. 2 shows a contact spring set for one of the other selecting bars in the cross bar switch, FIG. 3 shows the principle for a selector consisting of an operating bar in the cross bar switch, FIGS. 4–5 show other embodiments for the contact spring sets pertaining to the separate selecting bar, FIGS. 6–7 show how a selector for 50 lines may be arranged according to the invention by means of two operating bars in the same cross bar switch, FIGS. 8–9 show embodiments for selection between 3 storeys or groups of contact bands.

FIGS. 1–3 show together how a selector for 25 or 26 lines may be arranged according to the invention. FIG. 1 shows a contact spring set for the separate selecting bar.

The selecting bar 3 is suspended to a spring *3c* and is pulled downwards by the selecting magnet S when operated. Along the selecting bar there are contact spring sets, one for each operating bar in the cross bar switch. Each contact spring set comprises a plinth 2 of insulating material and eight contact springs arranged in two groups above each other, one upper group *2a* and a lower group *2b*. For each one of these two groups there is a driver 4 and 5, respectively, which rests against the uppermost contact spring in the group and is combined with the selecting bar 3 by means of a resilient arm *4a* and *5a*, respectively. In the figure there is furthermore shown an operating bar 6 with a square hole *6a*, the contact bands *a1*, *b1*, *c1*, *d1*, *a2*, *b2*, *c2*, *d2* of the operating bar being also indicated. The contact springs *2a—2b* are supported in a contact bank shown in FIG. 4 by the indication 7 and they are run through spacious holes in the drivers 4 and 5.

When the selecting bar is not operated, the driver 5 presses against the operating bar with its lower point *5b*, which is in the hole *6a*, and is thus engaged by the operating bar, while the driver 4 is held out of reach of the operating bar 6, when this is lifted by the operating magnet B in FIG. 3. If the operating bar 6 is lifted, the driver 5 and the contact springs *2b* are brought into contact with the contact strips *a2*, *b2*, *c2*, *d2*.

When the selecting bar 3 is pulled downwards by the magnet S and the operating bar 6 is not operated, the two drivers 4 and 5 will turn round their suspension points. The driver 5 is thereby deflected out of engagement with the operating bar 6 by its lower point being moved out into the hole *6a* towards the second side of the hole. At the same time the driver 4 comes into engagement with the operating bar 6 and its lower point *4b* presses against the edge of the operating bar. If then the operating bar 6 is lifted, the driver 4 is operated and the contact springs *2a* are brought into contact with the contact bands *a1*, *b1*, *c1*, *d1*. The selecting bar 3 is provided with the arms *3a* and *3b*, which are so shaped that the points *4b* and *5b* of the drivers are making approximately equally great movements.

The contact spring sets, which constitute the multiple of the cross bar switch, are manufactured according to FIG. 2. The operating bar 6 and the contact bands *a1*, *b1*, *c1*, *d1*, *a2*, *b2*, *c2*, *d2* are the same as in FIG. 1. The driver 41 is by means of the spring *41a* connected with the selecting bar 31 and rests against the uppermost contact spring *21a*. When the selecting bar 31 is pulled downwards, the driver 41 turns round its suspension point and will be engaged by the operating bar 6. If the operating bar 6 is lifted, the contact springs *21a—21b* are operated and brought into contact with the contact bands *a1*, *b1*, *c1*, *d1*, *a2*, *b2*, *c2*, *d2*. The uppermost contact springs *21a* are each connected with a vertical conductor pertaining to a line L1 which is multipled over all the operating bars in the cross bar switch, and the lower contact springs *21b* are each connected with a conductor pertaining to a likewise multipled line L2.

The conductors *a*, *b*, *c*, *d* pertaining to the line F, which pertains to the operating bar 6 according to FIG. 3, are branched into the two groups *2a* and *2b* of contact springs in the separate contact spring set 14 over the conductors F1 and F2. The contact spring set 14 is manufactured according to FIG. 1. Furthermore there are 13 contact spring sets 1, 2 . . . 12, 13 manufactured according to FIG. 2. The contact bands *a1–d1* with pertaining contact springs *21a* in the contact spring sets 1–13 constitute an upper storey, and the lines L1 pertaining to this are all supposed to be provided with numbers, which end with an odd figure. The contact bands *a2–d2* with pertaining contact springs *21b* constitute a lower storey, and the lines L2 pertaining to the same have numbers, which end with an even figure. By means of the contact spring set 14 selection is made between lines with odd numbers and lines with even numbers.

With 13 lines in the upper storey and 12 lines in the lower storey selection is made over 25 lines by means of each operating bar. If two operating bars, which pertain to different cross bar switches, are connected to the same line F, a selector for 50 lines will be obtained, the operating bar thereby determining the 25-group and the selecting bar 3 for the groups 14 distinguishing between lines with odd numbers and lines with even numbers. Each of the selecting bars 1–13 determines two pairs of lines.

FIG. 4 shows how the operating bar 6 may come into engagement with one or the other of two fixed drivers 4 and 5 by means of a movable operating member 8, which permanently follows the movements of the operating bar. The plinth 2 is mounted on a plate 1, which forms the frame of a selecting bar unit comprising a selecting bar 3 and a number of contact spring sets 2*a*—2*b*. The operating member 8 is suspended to a pin 9, which is fixed to the plate 1 and round this pin the operating member turns, when the selecting bar 3 is pulled downwards. When the selecting bar 3 is not operated and the operating bar 6 lifts the operating member 8, the driver 4 is operated by the upper portion 8*c* of the operating member and the contact springs 2*a* are brought into contact with the contact bands *a*1, *b*1, *c*1, *d*1. The operating member 8 is provided with a triangular hole 8*d* so shaped, that the operating member may be lifted from the pin 9. When the selecting bar 3 is pulled downwards, the operating member 8 is turned round the pin 9 as the resilient arm 8*a*, which is fixed to a hole 8*e*, exerts a turning moment on the operating member. The upper portion 8*c* of the operating member is deflected out of engagement with the driver 4 and its lower portion 8*b* is engaged by the driver 5. When the operating bar 6 lifts the operating member 8, the driver 5 is lifted and the contact springs 2*b* are brought into contact with the contact bands *a*2, *b*2, *c*2, *d*2.

As appears from FIG. 4 the contact bands *a*1–*d*1, *a*2–*d*2 are supported by a contact bank 7 consisting of a plinth of insulating material provided with grooves, in which the contact bands are resting, and with holes, in which the contact springs 2*a*—2*b* are supported.

FIG. 5 shows a third embodiment of the invention, in which the selecting bar 3 revolves round its longitudinal axis by means of its electromagnet. A resilient arm 8 is fixed to the plinth 2 below the contact springs 2*a*—2*b* and is operated by a lip 3*a*, when the selecting bar is turned. When the selection bar is not operated, the arm 8 is lifted by the operating bar 6 and operates the driver 5 and the contact springs 2*b*. When the selecting bar 3 is operated, the arm 8 is lifted from the driver 5 to the driver 4, and then the movement of the operating bar is transmitted to the contact springs 2*a*. FIGS. 6–7 show how a selector for 50 lines may be built by means of two operating bars 61 and 62 pertaining to the same cross bar switch, which is supposed to have 14 selecting bars according to FIG. 3. The conductors *a*, *b*, *c*, *d* of the line F, which is connected to the selector, are multipled to four groups (2*a*, 2*b*, 2*c*, 2*d*) of contact springs, pertaining to two contact spring sets, having each 8 contact springs and two drivers 41 and 42, respectively 51 and 52 and which are each operated by an operating bar 61—62 by means of an operating member 81 and 82, respectively. The operating members 81 and 82 are connected with the separate selecting bar 3 by means of resilient arms 81*a* and 82*b*, respectively, in accordance with FIG. 3. The contact bands of the selector constitute four storeys *a*1–*d*1, *a*2–*d*2, *a*3–*d*3, *a*4–*d*4. When the selecting bar 3 is not operated, the line F is connected to the contact bands *a*1–*d*1 means of the operating bar 61 and the driver 41 and to the contact bands *a*3–*d*3 by means of the operating bar 62 and the driver 51. When the selecting bar 3 is operated, the line F is connected to the contact bands *a*2–*d*2 by means of the operating bar 61 and the driver 42 and to the contact bands *a*4–*d*4 by means of the operating bar 62 and the driver 52.

The contact spring sets for the other 13 selecting bars in the cross bar switch are manufactured according to FIG. 7. The plinths 21—22 support each on one hand 8 contact springs, on the other hand 16 vertical conductors pertaining to four lines L1, L2, L3, L4, which two and two are multipled to every second contact spring set in the cross bar switch. To each contact spring set there belongs a driver 71 and 72, respectively, connected with the selecting bar 31 by means of a resilient arm 71*a* and 72*a*, respectively. When the selecting bar 31 is pulled downwards, the drivers 71 and 72 are moved along the contact springs, so that they come into engagement with the operating bars 61 and 62.

When the selecting bar 31 is operated and the operating bar 61 lifts the drivers 41 and 71, the line F is connected to the line L1 over the contact bands *a*1–*d*1. If the operating bar 62 lifts the drivers 51 and 72, the line F is connected to the line L3 over the contact bands *a*3—*d*3. If the selecting bars 3 and 31 are simultaneously operated, the line F is interconnected with one of the lines L2 and L4 over the contact bands *a*2–*d*2 and *a*4–*d*4, respectively.

The cross bar switch according to FIG. 8 is within the range of each operating bar provided with two rows of contact springs G1, G2 for each selecting bar. In the drawing only the rows for three selecting bars are shown. Each selecting bar controls for each operating bar in the usual manner a selecting member A1, respectively A2 and A3, which may take up three positions, viz. one middle position and two external positions. The selecting member is moved from its middle position to one or the other of its external positions, when one or the other of the two selecting magnets, which pertain to each selecting bar, is operated. When for example the selecting member A1 has been moved to its left external position, it brings about in the usual manner upon operation of the operating magnet by means of the operating bar B, that a driver L1 operates the nine contact springs in the contact row G1, so that they make contact with nine contact bands S. The selecting members A1, A2 located in the middle position operate no driver, as is the case with other normally designed contact rows G1, G2. According to the invention there is however for the two contact rows G1, G2, which pertain to a selecting bar, farthest to the right a separate driver 35, which is arranged to be operated upon operation of the operating magnet by means of the selecting member A3 of this selecting bar, when said selecting member is in its middle position. In this particular group the contact spring row G1 consists of the springs 11–19 and the contact spring row G2 of the springs 21–29, in the same manner as all other contact spring rows. Each of the two rows G1 and G2 is also in the same manner as other rows provided with a driver 20 and 33, respectively. When the selecting member A3 upon operation of one selecting magnet is moved to its left position 31, it will however, upon operation of the operating magnet, lift only the three upper contact springs 11, 12 and 13, as the driver 20 only is provided with supports 32 for these three springs. The right driver 33, which is operated, when the selecting member is in the position 34, is only provided with supports for the contact springs 24, 25, 26 and thus only these may be operated when the driver 33 is lifted. Between the two contact spring rows there is located according to the invention a third driver 35 which is adapted to operate the three lowest springs in each row, i.e. the springs 17, 18, 19 and the springs 27, 28, 29. If the selecting member A3 is in its middle position, when the operating magnet is operated, it causes the driver 35 to be lifted, said three lower springs in both groups thus being brought to make contact with their respective contact bands. The springs 17 and 27 are suitably connected in parallel like the springs 18 and 28 and 19 and 29.

In the indicated manner there will be obtained within the contact spring rows G1, G2 three different groups or storeys, viz. an upper storey with the contact springs 11, 12, 13, an intermediate storey with the contact springs 24, 25, 26 and a lower storey, in which the three lower springs 17, 27 respectively 18, 28 and 19, 29 are included.

It is of course possible to let the intermediate driver 35 operate contacts only on one side, i.e. only in one of the groups G1 and G2 but this is mechanically not so suitable. At the now described application of the invention it is possible to use the same contact springs in the whole operating bar multiple which gives a much simpler construction and low costs of production.

If now the three groups or storeys of contact springs are connected in parallel to one group of three incoming lines they may, upon operation of the operating magnet, over their respective bands S be connected with corresponding contact springs in whichever of the other rows G1, G2. If, for example, the selecting member A1 is supposed to be moved by pertaining selecting bar to its right position and the member A3 to its left position, when the operating magnet is operated, the three contact springs 11, 12, 13 are connected with a group consisting of the three upper contact springs in the row G2 operated by the selecting member A1. If instead the selecting member A3 had remained in its middle position the three lower contact springs 17, 18, 19 would have been connected with a group consisting of the three lower contact springs in the row G2 operated by the selecting member A1 and so on. In this manner the incoming group of three lines may be connected with whichever of three storeys or groups of contact springs in each row of contact springs pertaining to a selecting magnet within an operating bar.

FIG. 9 shows how three storeys or groups of contact bands A, B, C may be distinguished by means of two magnets but only one selecting bar and one contact spring set. A separate selecting bar 3 with two selecting magnets S1 and S2 is mounted on a plate 1, which simultaneously supports a contact spring set for each operating bar 6. Each contact spring set consists of a plinth 2 with nine contact springs divided into three groups 2*a*, 2*b* and 2*c*. For each group there is a driver 4, 5 and 7, respectively. The selecting bar 3 supports a selecting member 8 for each operating bar 6. The selecting member consists of a wire of spring steel which is spirally twisted at one end. The magnets S1 and S2 operate a common armature 9, to which the selecting bar 3 is so fixed, that it may be turned round its longitudinal axis in one or the other direction. The selecting bar is mounted in bearings 3*c* and is kept in a middle position by means of two springs 3*a* and 3*b*, the selecting member 8 being located below the driver 7. If the operating bar 6 is operated without any one of the selecting magnets S1 or S2 having first attracted the armature 9, the contact springs 7 will be operated and the lowest storey C is connected. If the selecting magnet S1 has attracted the armature 9, when the operating bar 6 is operated, the selecting member 8 is located below the driver 5 and the contact springs 2*b* are operated. The storey B is connected. If the selecting magnet S2 has attracted the armature 9, when the operating bar 6 is operated, the selecting member 8 is located below the driver 4 and the contact springs 2*a* are operated. The storey A is connected.

We claim:

1. In an automatic telephone system cross bar switch having operating bars with operating magnets, selecting bars with selecting magnets for a switch multiple, and an additional selecting bar with at least one selecting magnet; at least two parallel sets of contact bands for each operating bar crossing all of said selecting bars, a contact spring set including contact springs for at least two lines in each crossing point in the multiple, means simultaneously actuating said contact springs, a contact spring stack for said additional selecting bar in each said crossing point including a separately actuated driver and a corresponding group of contact springs for each of at least two of the groups of contact bands in the crossing point, and a selecting finger common to said drivers movable by said additional selecting bar from a rest position to at least one side position, said finger in said rest position coupling a first one of said drivers to the operating bar of the crossing point and in a side position coupling a second one of said drivers to the operating bar.

2. A cross bar switch as set forth in claim 1, further comprising three parallel groups of contact bands for each operating bar and three separately actuated drivers each with a corresponding group of contact springs in each contact spring stack for the additional selecting bar, and two selecting magnets for the additional selecting bar turning the bar in different directions and thereby moving the selecting fingers of the bar from the rest position to any one of two side positions.

3. In an automatic telephone system cross bar switch having operating bars with operating magnets, selecting bars with selecting magnets for a switch multiple, and an additional selecting bar with two selecting magnets; three parallel sets of contact bands for each operating bar crossing all of said selecting bars, at least one contact spring set including contact springs for three lines in each crossing point in the multiple, means simultaneously actuating said contact springs, two contact spring stacks for said additional selecting bar in each said crossing point, one of said contact spring stacks comprising a separately actuated driver and a corresponding group of contact springs for each of the groups of contact bands in the crossing point, and a selecting finger common to said drivers of said two stacks movable by said additional selecting bar from a rest position to any one of two side positions, said finger in said rest position coupling a first one of said drivers to the operating bar of the crossing point and in said two side positions coupling a second respectively a third one of said drivers to the operating bar.

4. In an automatic telephone system cross bar switch having operating bars with operating magnets, selecting bars with selecting magnets for a switch multiple, and an additional selecting bar with two selecting magnets; three parallel sets of contact bands for each operating bar crossing all of said selecting bars, at least one contact spring set including contact springs for three lines in each crossing point in the multiple, means simultaneously actuating said contact springs, two contact spring stacks for said additional selecting bar in each said point, each of said contact spring stacks comprising a separately actuated driver and a corresponding group of contact springs for one of the groups of the contact bands in the crossing point and together comprising a common separately actuated driver, a corresponding group of contact springs in each stack for the third group of said contact bands in the crossing point, and a selecting finger common to all of said drivers movable in different directions of said additional selecting bar from a rest position coupling said common driver to the operating bar of the crossing point and in two side positions coupling the respective individual driver to the operating bar.

References Cited in the file of this patent

UNITED STATES PATENTS

| | | |
|---|---|---|
| 1,541,164 | Miller | June 9, 1925 |
| 2,301,472 | Stockfleth | Nov. 10, 1942 |
| 2,535,769 | Wicks | Dec. 26, 1950 |
| 2,769,880 | Holmqvist | Nov. 6, 1956 |